(12) United States Patent
Hoffmann

(10) Patent No.: US 6,555,826 B2
(45) Date of Patent: Apr. 29, 2003

(54) APPARATUS FOR ILLUMINATING A SPECIMEN AND CONFOCAL FLUORESCENCE SCANNING MICROSCOPE

(75) Inventor: Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/805,315

(22) Filed: Mar. 13, 2001

(65) Prior Publication Data

US 2001/0042837 A1 Nov. 22, 2001

(30) Foreign Application Priority Data

Mar. 15, 2000 (DE) .......................................... 100 12 462

(51) Int. Cl.⁷ ............................................... G01N 21/64
(52) U.S. Cl. .................................. 250/458.1; 250/459.1
(58) Field of Search ........................... 250/458.1, 459.1, 250/461.1; 359/368, 383, 385, 389, 387, 388

(56) References Cited

U.S. PATENT DOCUMENTS 5,535,052 A * 7/1996 Jorgens ....................... 359/388
5,866,911 A * 2/1999 Baer ......................... 250/458.1
6,333,776 B1 * 12/2001 Taniguchi ..................... 355/52

FOREIGN PATENT DOCUMENTS

WO    WO 95/21393    8/1995

* cited by examiner

Primary Examiner—Constantine Hannaher
Assistant Examiner—Timothy Moran
(74) Attorney, Agent, or Firm—Simpson & Simpson, PLLC

(57) ABSTRACT

An apparatus for illuminating a specimen (1), preferably in confocal fluorescence scanning microscopy is disclosed. Two illumination beam paths (2, 4) are combined with a beam splitter (6) in order to simplify alignment and reduce the optical components in the illumination beam path. The at least one optical component (7) is arranged at least in one of the illumination beam paths (2, 4) and modifies the light; and that the optical properties of the component (7) can be influenced or modified in such a way that the illumination pattern of the illumination beam path (2, 4) in the specimen region changes shape.

16 Claims, 3 Drawing Sheets

APPARATUS FOR ILLUMINATING A SPECIMEN AND CONFOCAL FLUORESCENCE SCANNING MICROSCOPE

CROSS REFERENCE TO RELATED APPLICATIONS

This invention claims priority of a German patent application DE 100 12 462.3 filed Mar. 15, 2000 which is incorporated by reference herein.

FIELD OF THE INVENTION

The present invention concerns an apparatus for illuminating a specimen. Furthermore the invention refers to a confocal fluorescence scanning microscope, having one illumination beam path of one light source and at least one further illumination beam path of a further light source, the illumination beam paths being at least partially superimposable on one another.

BACKGROUND OF THE INVENTION

Apparatuses of the generic type are known, in particular in the context of confocal fluorescence scanning microscopy, from WO 95 21 393. In this apparatus, in order to increase the lateral resolution a specimen point is illuminated with an exciting light beam, as a result of which the fluorescent molecules, thereby acted upon by exciting light, are brought into an excited state. The specimen point is furthermore illuminated with a stimulating light beam of suitable wavelength, as a result of which fluorescent molecules that are in the excited state can be brought back into the ground state by the process of stimulated emission. The exciting light beam and the stimulating light beam are, in this context, arranged in such a way that their intensity distributions or illumination patterns partially overlap one another in the specimen region. The fluorescent molecules lying in the overlap region are brought into the ground state by stimulated emission immediately after excitation by the exciting light beam, so that fluorescent light is detected only from the fluorescent molecules that are located in the illumination pattern of the exciting beam but not in the illumination pattern of the stimulating beam or in the overlap region of the two illumination patterns. The stimulated emitted light and reflected stimulating light are filtered out of the detection beam path of the scanning microscope by way of optical filters, so that only fluorescent light from the region of the illumination pattern of the exciting beam, minus the overlap region of the two illumination patterns, is detected. This reduction makes it possible to shrink the specimen region contributing to the fluorescent emission to a size below the limits of diffraction-limited imaging, and thus represents an improvement in resolution.

In the known generic apparatuses, alignment of the exciting and stimulating light beams is problematic, since the two light beams must be arranged with respect to one another in a spatially well-defined fashion. The individual optical components are positioned manually or in motorized fashion for this purpose, which entails a great deal of design outlay especially with regard to long-term stability. Longitudinal expansion of the entire optical arrangement due to changes in temperature must also be compensated for. Depending on the shape of the stimulating light beam illumination pattern that is to be produced, it may be necessary to use several optical components; this disadvantageously increases the number of degrees of alignment freedom.

SUMMARY OF THE INVENTION

It is therefore the object of the present invention to configure and develop an apparatus for illuminating a specimen in which alignment is simplified and the number of optical components for each stimulation beam path can be reduced.

The above object is achieved by an apparatus for illuminating a specimen having one light source defining an illumination beam path, at least one further light source defining a further illumination beam path wherein the illumination beam paths being at least partially superimposable on one another and at least one optical component being arranged at least in one of the illumination beam paths for modifying the light, wherein the optical component has properties which are influenced or modified in such a way that a defined illumination pattern of the illumination beam path in the specimen region changes shape.

It is a further object of the present invention to provide a confocal fluorescence scanning microscope for illuminating a specimen in which alignment is simplified and the number of optical components for each stimulation beam path can be reduced.

The object is achieved by a confocal fluorescence scanning microscope, having one light source defining an illumination beam path, at least one further light source defining a further illumination beam path wherein the illumination beam paths being at least partially superimposable on one another, at least one optical component being arranged at least in one of the illumination beam paths for modifying the light, wherein the optical component has properties which are influenced or modified in such a way that a defined illumination pattern of the illumination beam path in the region of a specimen changes shape, and an objective for imaging at least one of the illumination beam paths on the specimen.

What has been recognized firstly according to the present invention is that alignment of the optical component can be simplified by the fact that the optical component can be influenced or modified in terms of its optical property. When the optical property of the component is modified, the component modifies the light of the corresponding illumination beam path and thus the illumination pattern in the specimen region. As a result, the illumination pattern of that illumination beam path can be modified, relative to that of another illumination beam path, in terms of its shape and/or its three-dimensional position, so that the illumination beam paths can be aligned with respect to one another.

Advantageously, and in a fashion comparable to alignment, it is possible by way of the modification of the optical property of the component to compensate for a temperature drift of the device, so that well-defined and optimum illumination and detection conditions exist at all times. Ideally, the use of a component whose optical property is modifiable makes it possible to dispense with a physically complex alignment and drift compensation apparatus, thereby (in particularly advantageous fashion) simplifying the optical beam path and moreover reducing manufacturing costs.

The optical component whose optical property is modifiable also makes it possible, by corresponding influence on or modification of the beam, to achieve the same effect as with several individual optical components, so that the number of optical components can be reduced.

An optical component is preferably arranged in the further illumination beam path. The latter accordingly acts only on the further illumination beam path, so that the shape of the illumination pattern of the further illumination beam path in the specimen region is thereby modified. The further illumination beam path could, in this context, be used as a stimulating light beam.

An optical component could also be arranged in the illumination beam path and/or in the detection beam path. The shape of the illumination pattern of the illumination beam path in the specimen region, and the shape of the detection pattern of the specimen region detectable by the detector, are thereby modified. A combined arrangement of several optical components in the illumination beam path and detection beam path is also conceivable. This would make it possible, for example with an optical component arranged in the further illumination beam path, for the illumination pattern of the further illumination beam path in the specimen region to be asymmetrical in shape, and, as a result of the placement of a further optical component in the illumination beam path, for the illumination pattern of the illumination beam path in the specimen region to be made mirror-symmetrical to the further illumination pattern. This procedure could be used to scan the specimen with an anisotropic or hexagonal pixel pattern.

In a particularly preferred embodiment, the optical component is arranged in a Fourier plane conjugated with the focal plane of the objective. As a result, with a corresponding configuration of the optical component according to the principles of Fourier optics, all spatial frequencies can be acted upon identically or differently.

In a concrete embodiment, the optical component modifies the phase of the light. Alternatively, the amplitude or the polarization of the light could be modified. A combination of modification of the phase, amplitude, or polarization of the light by the optical component is also conceivable.

The optical component could be embodied as a transilluminating or reflecting component in the beam path associated with it.

For modification of the optical property of the component, the latter is embodied as an adaptive optic. It can act on the entire light beam in the same manner, or locally differently.

Concretely, the optical component could be embodied as a liquid crystal device (LCD). By appropriate activation of the LCD element it is possible, pixel by pixel, to delay the phase of the incident light and/or to reduce the amplitude of the incident light. Since each individual pixel in an LCD element can be directly controlled, this arrangement is, in particularly advantageous fashion, very flexible, and also allows the optical properties of the component to be modified during operation.

In a further embodiment, the optical component is embodied as a color LCD. This is highly advantageous especially when the color LCD element is arranged in a beam path in which light of different wavelengths is proceeding. By setting the color LCD element appropriately, the latter can act, pixel by pixel and in chromatically selective fashion, on light of one or several wavelengths.

In very general terms, the optical component could be embodied as a micromechanical system. In particular, the optical component could be embodied as a digital micromirror (DMD) or as a grating light valve (GLV). These optical components also can be activated pixel by pixel, so that individual regions of the corresponding beam path can be reflected out or influenced. Alternatively, a deformable mirror could be used as the optical component. Individual regions of the deformable mirror can be modified in terms of their surface shape, so that the illumination or detection pattern of the corresponding beam path changes shape.

In particularly advantageous fashion, the modification of the optical properties of the optical component can be synchronized with definable events. For example, the optical component could be synchronized with the intensity modulation or pulse train of the light source. Synchronization of the scanning device of the scanning microscope with the optical component could advantageously serve to compensate for chromatic transverse or longitudinal errors of the optical system used in the scanning microscope which can exhibit a lateral or axial dependence on the particular illumination point. In order to optimize signal yield, synchronization of the detector device with the modification of the optical property of the component can also be provided.

The optical component can act on the entire beam path or on a portion of the beam path. Preferably the optical component is dimensioned in such a way that it is larger than the cross section of the beam path interacting with it, so that the optical component acts on the entire illumination beam path. Alternatively, however, the opposite case would be conceivable, namely that the cross section of the beam path is larger than the dimension of the optical component.

With the aid of the optical component, the illumination pattern of the illumination beam path and/or of the further illumination beam path can be shaped in defined fashion. In particular, a toroidal illumination pattern of the further illumination beam path might be extremely advantageous in order to increase the lateral resolution, if the torus is located in the focal plane of the objective and is arranged symmetrically with respect to the illumination pattern of the illumination beam path. Stimulated emission by the fluorescent molecules excited in the overlap region of the two illumination patterns can thereby be excited, so that with suitable detection, only fluorescent light from the region of the illumination pattern minus the overlap region is detectable. In addition, an optical component arranged in the illumination beam path could shape the illumination pattern in such a way that the latter has substantially the shape of a barrel, parallelepiped, cube, or sphere. Ultimately the shape of the particular illumination pattern needs to be adapted to the boundary conditions of the application, for example with the goal of maximum resolution with a maximum signal-to-noise ratio.

In very particularly advantageous fashion, the illumination pattern of the further illumination beam path is complementary in configuration to the illumination pattern of the illumination beam path, so that an increase in resolution in all spatial directions is possible.

An illumination pattern that is isotropic in all spatial directions is highly advantageous in particular for quantitative analysis, since the specimen images obtained in this fashion have identical resolution, and thus an equidistant pixel size, in all spatial directions.

To maximize the signal-to-noise ratio, provision is made for the illumination pattern to be configured in such a way that it has at least largely a homogeneous intensity distribution. As a result, the fluorescent molecules that are acted upon by the light of the illumination pattern are excited to fluoresce with identical intensity, and the fluorescent molecules whose stimulated emission is excited by the further illumination pattern are brought into the ground state with the same transition probability. For this purpose, provision is made for the intensity distribution of the illumination pattern to fall off sharply at the edge, thus resulting in the sharpest possible transition between the region to be measured and the region to be stimulated.

BRIEF DESCRIPTION OF THE DRAWINGS

There are various ways of advantageously embodying and developing the teaching of the present invention. Reference is made to the drawings below. In the drawings.

DETAILED DESCRIPTION OF THE INVENTION

Figure 1:
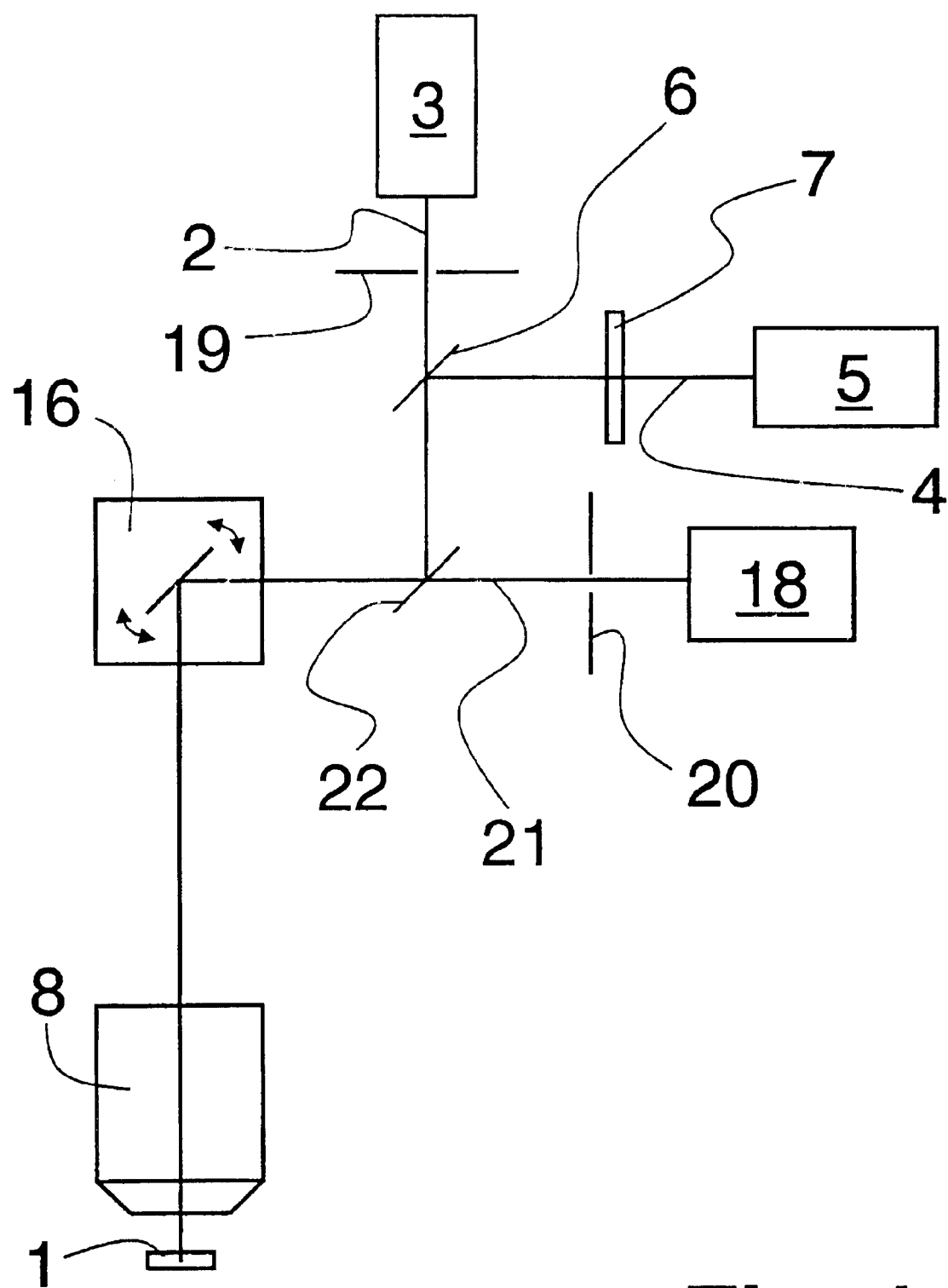
FIG. 1 schematically depicts a first embodiment according to the present invention.

FIG. 1 shows an apparatus for illuminating a specimen 1 in the context of confocal scanning fluorescence microscopy. The scanning fluorescence microscope has an illumination beam path 2 of a light source 3 which provides point-like fluorescence excitation of specimen 1. A further illumination beam path 4 of a further light source 5 provides stimulated emission of fluorescent molecules in a well-defined specimen region; illumination beam paths 2, 4 can be superimposed on one another. The two illumination beam paths 2, 4 are combined with the aid of beam splitter 6.

According to the present invention, an optical component 7 which modifies the light of illumination beam path 4 is arranged in illumination beam path 4. The optical properties of component 7 can be influenced or modified in such a way that the illumination pattern of illumination beam path 4 in the specimen region changes shape.

Optical component 7 is arranged in a Fourier plane conjugated with the focal plane of objective 8.

Optical component 7 modifies the phase and the amplitude of the light, and is embodied as a transilluminating component.

Optical component 7 is an LCD element that delays the phase of the incident light, pixel by pixel, by $\lambda/2$. Individual spatial frequencies can thus, as a function of the activation of the LCD element, be phase-delayed by $\lambda/2$ and moreover can be attenuated in terms of their amplitude. As a result of the modification of the phase or amplitude of further illumination beam path 4 by optical component 7, the shape of the illumination pattern of further illumination beam path 4 in the specimen region is changed.

Figure 2:
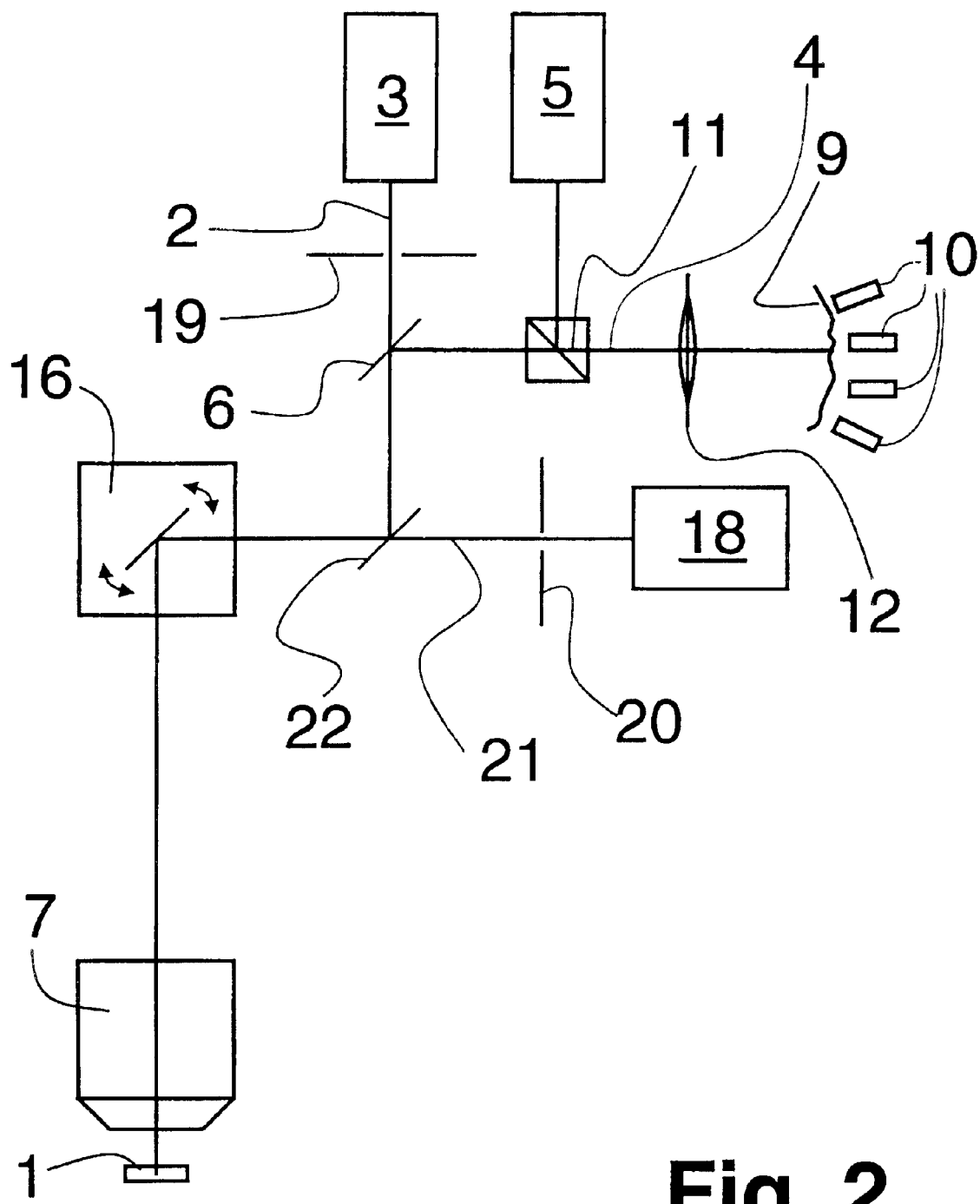
FIG. 2 schematically depicts a further embodiment.

FIG. 2 shows an alternative embodiment of the apparatus according to the present invention. Here the optical component is embodied as a deformable mirror 9 that is arranged, as a reflective component, in further illumination beam path 4. Deformable mirror 9 can be adjusted by way of piezoactuators 10.

Figure 3:
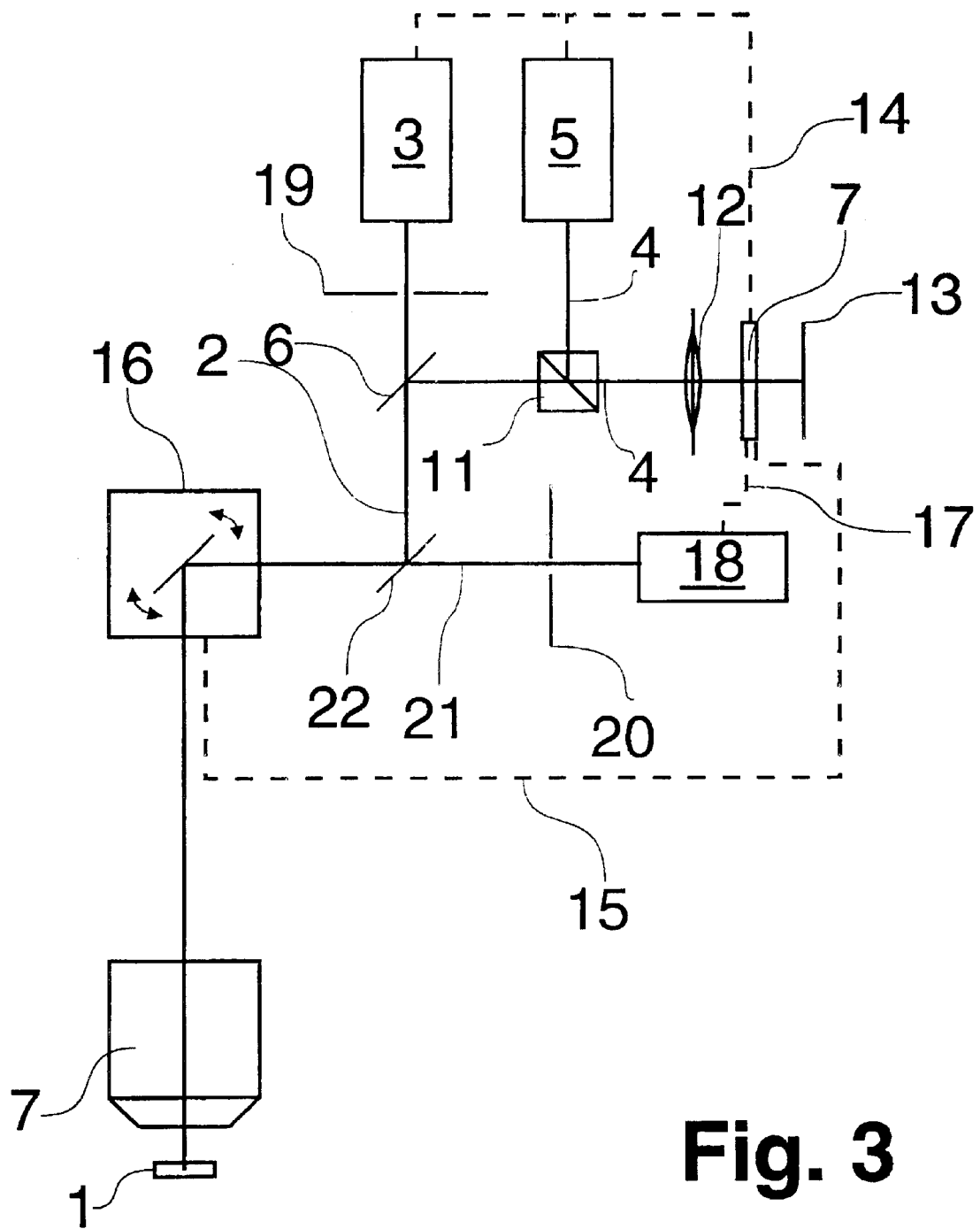
FIG. 3 schematically depicts a further embodiment.

FIG. 3 shows an embodiment of the apparatus according to the present invention as an alternative to FIG. 2. Light from light source 5 strikes beam splitter cube 11 and is reflected in the direction of the schematically indicated spreading optical system 12. After passing through optical component 7 which is embodied as an LCD element, the light of further illumination beam path 4 strikes mirror 13, which reflects the light through optical component 7, spreading optical system 12, and beam splitter cube 11 to beam splitter 6. At beam splitter 6, further illumination beam path 4 is combined with illumination beam path 2 of light source 3.

In this embodiment, the modification of the optical properties of component 7 can be synchronized with definable events. Optical component 7 is connected via synchronization means 14 (shown with dashes) to pulsed laser light source 5 and to laser light source 3. Optical component 7 can be activated as a function of the pulse train of pulsed laser 5. Optical component 7 is connected to scanning device 16 via synchronization means 15 (shown with dashes). This makes possible synchronization of scanning device 16 with optical component 7. Optical component 7 is connected in similar fashion to detector 18 via synchronization means 17 (shown with dashes).

FIG. 4 illustrates a schematic representation of an illumination pattern 25 generated by the present invention. The optical component 7 influences the light in the further illumination beam path 4 in a way that within the specimen 1 a barrel 25 results from the combination of the two illumination beam paths 2 and 4.

In conclusion, be it noted very particularly that the exemplary embodiments discussed above serve merely to describe the teaching claimed, but do not limit it to the exemplary embodiments.

PARTS LIST

1 Specimen
2 Illumination beam path
3 Light source of (2)
4 Further illumination beam path
5 Light source of (4)
6 Beam splitter
7 Optical component
8 Objective
9 Deformable mirror
10 Piezoactuators of (9)
11 Beam splitter cube
12 Spreading optical system
13 Mirror
14 Synchronization means between (5, 3) and (6)
15 Synchronization means between (6) and (15)
16 Scanning device
17 Synchronization means between (17) and (6)
18 Detector
19 Excitation pinhole
20 Detection pinhole
21 Detection beam path
22 Beam splitter

What is claimed is:

1. An apparatus for illuminating a specimen (1), having one light source (3) defining an illumination beam path (2), at least one further light source (5) defining a further illumination beam path (4), a beam splitter (6) for combining the illumination beam paths (2, 4) and at least one optical component (7) being arranged at least in one of the illumination beam paths (2, 4) for modifying the light possessing a phase, an amplitude and a polarization, wherein the optical component (7) has properties which are influenced or modified in such a way that a defined illumination pattern of the illumination beam path (2, 4) in the specimen region changes shape.

2. The apparatus as defined in claim 1, characterized in that the optical component (7) is arranged in a detection beam path (21).

3. The apparatus as defined in claim 1, characterized in that the optical component (7) is arranged in a Fourier plane of a focal plane of an objective (8).

4. The apparatus as defined in claim 1, characterized in that the modification of the optical component (7) modifies the phase of the light or the amplitude of the light or the polarization of the light.

5. The apparatus as defined in claim 1, characterized in that the optical component (7) consists essentially of a transilluminating component, a reflecting component, an adaptive optic, a liquid crystal device (LCD), a color LCD, a micromechanical system, a digital micromirror (DMD), a grating light valve (GLV), or a deformable mirror (8).

6. The apparatus as defined in claim 1, characterized in that the modification of the optical properties of the optical component (7) is synchronized with definable events.

7. The apparatus as defined in claim 1, characterized in that the optical component (7) acts on the entire illumination beam path.

8. The apparatus as defined in claim 1, characterized in that the optical component (7) acts on a portion of the illumination beam path.

9. A confocal fluorescence scanning microscope, having one light source (3) defining an illumination beam path (2), at least one further light source (5) defining a further illumination beam path (4), a beam splitter (6) for combining the illumination beam paths (2, 4), at least one optical component (7) being arranged at least in one of the illumination beam paths (2, 4) for modifying the light possessing a phase, an amplitude and a polarization, wherein the optical component (7) has properties which are influenced or modified in such a way that a defined illumination pattern of the illumination beam path (2, 4) in the region of a specimen (1) changes shape, and an objective for imaging at least one of the illumination beam on the specimen (1).

10. The confocal fluorescence scanning microscope as defined in claim 9, characterized in that the optical component (7) is arranged in a detection beam path (21).

11. The confocal fluorescence scanning microscope as defined in claim 9, characterized in that the optical component (7) is arranged in a Fourier plane of a focal plane of the objective (8).

12. The confocal fluorescence scanning microscope as defined in claim 9, characterized in that the modification of the optical component (7) modifies the phase of the light or the amplitude of the light or the polarization of the light.

13. The confocal fluorescence scanning microscope as defined in claim 9, characterized in that the optical component (7) consists essentially of a transilluminating component, a reflecting component, an adaptive optic, a liquid crystal device (LCD), a color LCD, a micromechanical system, a digital micromirror (DMD), a grating light valve (GLV), or a deformable mirror (8).

14. The confocal fluorescence scanning microscope as defined in claim 9, characterized in that the modification of the optical properties of the optical component (7) is synchronized with definable events.

15. The confocal fluorescence scanning microscope as defined in claim 9, characterized in that the optical component (7) acts on the entire illumination beam path.

16. The confocal fluorescence scanning microscope as defined in claim 9, characterized in that the optical component (7) acts on a portion of the illumination beam path.

* * * * *

UNITED STATES PATENT AND TRADEMARK OFFICE
CERTIFICATE OF CORRECTION

PATENT NO. : 6,555,826 B2
DATED : April 29, 2003
INVENTOR(S) : Juergen Hoffmann

It is certified that error appears in the above-identified patent and that said Letters Patent is hereby corrected as shown below:

<u>Column 6,</u>
Lines 3-8, cancel beginning with "FIG. 4 illustrates" to and including "paths 2 and 4."

<u>Column 7,</u>
Line 19, insert the word "paths" between "beam" and "on".

Signed and Sealed this

Twenty-sixth Day of August, 2003

JAMES E. ROGAN
*Director of the United States Patent and Trademark Office*